US008959292B1

(12) United States Patent
Ahn et al.

(10) Patent No.: US 8,959,292 B1
(45) Date of Patent: Feb. 17, 2015

(54) ATOMIC MEMORY ACCESS HARDWARE IMPLEMENTATIONS

(75) Inventors: Jung Ho Ahn, Palo Alto, CA (US); Mattan Erez, Rollingwood, TX (US); William J. Dally, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1657 days.

(21) Appl. No.: 11/643,026

(22) Filed: Dec. 20, 2006

Related U.S. Application Data

(60) Provisional application No. 60/753,164, filed on Dec. 22, 2005.

(51) Int. Cl.
  *G06F 12/00* (2006.01)
  *G06F 9/38* (2006.01)
  *G06F 3/06* (2006.01)

(52) U.S. Cl.
  CPC .............. *G06F 3/067* (2013.01); *G06F 9/3895* (2013.01)
  USPC ........................................................ 711/154

(58) Field of Classification Search
  None
  See application file for complete search history.

(56) References Cited

U.S. PATENT DOCUMENTS

| | | | | |
|---|---|---|---|---|
| 5,706,464 | A * | 1/1998 | Moore et al. | 711/122 |
| 6,873,738 | B2 * | 3/2005 | Kondo | 382/240 |
| 7,136,987 | B2 * | 11/2006 | Chen | 711/211 |
| 2006/0143404 | A1 * | 6/2006 | Chen et al. | 711/141 |
| 2006/0179275 | A1 * | 8/2006 | Yamazaki | 712/205 |

OTHER PUBLICATIONS

Merrimac: Supercomputing with Streams, William J Dally et al, Proceedings of the ACM/IEEE SC2300 Conference.*
Imagine: Media Processing with Streams, Brucek Khailay et al, Micro, IEEE 2001.*
The Imagine Stream Processor, Ujval J. Kapasi et al, Proceedings of the 2002 International Conference on Computer Design.*
Analysis and Performance Results of a Molecular Modeling Application on Merrimac, Mattan Erez et al, Proceedings of the 2004 ACM/IEEE conference on Supercomputing.*
Evaluating the Imagine Stream Architecture, Jung Ho Ahn et al, Computer Architecture, 2004, Proceedings 31st Annual International Symposium on Computer Architecture.*
S. Bae, K. A. Alsabti, and S. Ranka. Array Combining Scatter Functions on Coarse-Grained, Distributed-Memory Parallel Machines, 1997.

(Continued)

*Primary Examiner* — Duc Doan
(74) *Attorney, Agent, or Firm* — Crawford Maunu PLLC

(57) ABSTRACT

Atomic memory access requests are handled using a variety of systems and methods. According to one example method, a data-processing circuit having an address-request generator that issues requests to a common memory implements a method of processing the requests using a memory-access intervention circuit coupled between the generator and the common memory. The method identifies a current atomic-memory access request from a plurality of memory access requests. A data set is stored that corresponds to the current atomic-memory access request in a data storage circuit within the intervention circuit. It is determined whether the current atomic-memory access request corresponds to at least one previously-stored atomic-memory access request. In response to determining correspondence, the current request is implemented by retrieving data from the common memory. The data is modified in response to the current request and at least one other access request in the memory-access intervention circuit.

19 Claims, 3 Drawing Sheets

(56) References Cited

OTHER PUBLICATIONS

L. Catabriga, M. Martins, A. Coutinho, and J. Alves. Clustered Edge-By-Edge Preconditioners for Non-Symmetric Finite Element Equations, 1998.

S. Chatterjee, G. E. Blelloch, and M. Zagha. Scan Primitives for Vector Computers. In *Supercomputing*, pp. 666-675, 1990.

W. J. Dally, P. Hanrahan, M. Erez, T. J. Knight, F. Labonté, J. H. Ahn, N. Jayasena, U. J. Kapasi, A. Das, J. Gummaraju, and I. Buck. Merrimac: Supercomputing with Streams. In SC2003, Nov. 2003.

D. Elliott, M. Snelgrove, and M. Stumm. Computational RAM: A memory-SIMD hybrid and its application to DSP. In *Custom Integrated Circuits Conference*, May 1992.

A. Gottlieb, R. Grishman, C. P. Kruskal, K. P. McAuliffe, L. Rudolph, and M. Snir. The NYU Ultracomputer—designing an MIMD parallel computer. *IEEE Transactions on Computers*, C-32(2):175-189, Feb. 1983.

High Performance Fortran Forum. High Performance Fortran language specification, version 1.0. Technical Report CRPC-TR92225, High Performance Fortran Forum, Houston, TX, 1993. 196 pgs.

W. D. Hillis and L. W. Tucker. The CM-5 Connection Machine: A scalable supercomputer. *Communications of the ACM*, 36(11):31-40, 1993.

Hoare and Dietz. A Case for Aggregate Networks. In *IPPS: 11th International Parallel Processing Symposium*, pp. 162-166. IEEE Computer Society Press, 1998.

Y. Kang, W. Huang, S. M. Yoo, D. Keen, Z. Ge, V. Lam, P. Pattnaik, and J. Torrellas. FlexRAM: Toward an Advanced Intelligent Memory System. In *International Conference on Computer Design*, pp. 192-201, Oct. 1999.

U. J. Kapasi, S. Rixner, W. J. Dally, B. Khailany, J. H. Ahn, P. Mattson, and J. D. Owens. Programmable Stream Processors. *IEEE Computer*, Aug. 2003.

R. E. Kessler and J. L. Schwarzmeier. Cray T3D: A new dimension for Cray Research. In *COMPCON*, pp. 176-182, Feb. 1993.

B. Khailany. *The VLSI Implementation and Evaluation of Area- and Energy-Efficient Streaming Media Processors*. PhD thesis, Stanford University, Jun. 2003. 152 pgs.

J. Laudon and D. Lenoski. The SGI Origin: A ccNUMA Highly Scalable Server. n *Proceedings of the 24th Annual International Symposium on Computer Architecture*, pp. 241-251, Jun. 1997.

C. E. Leiserson, Z. S. Abuhamdeh, D. C. Douglas, C. R. Feynman, M. N. Ganmukhi, J. V. Hill, W. D. Hillis, B. C. Kuszmaul, M. A. S. Pierre, D. S. Wells, M. C. Wong-Chan, S.-W. Yang, and R. Zak. The network architecture of the Connection Machine CM-5. *Journal of Parallel and Distributed Computing*, 33(2):145-158, 1996.

M. Oskin, F. T. Chong, and T. Sherwood. Active Pages. A Computation Model for Intelligent Memory. In *Proceedings of the 25th Annual International Symposium on Computer Architecture*, pp. 192-203, 1998.

S. Rixner, W. J. Dally, U. J. Kapasi, P. Mattson, and J. D. Owens. Memory Access Scheduling. In *Proceedings of the 27th Annual International Symposium on Computer Architecture*, pp. 128-138, Jun. 2000.

S. L. Scott. Synchronization and communication in the T3E multiprocessor. In *Proceedings of the 7th International Conference on Architectural Support for Programming Languages and Operating Systems*, pp. 26-36, 1996.

M. Woodacre, D. Robb, D. Roe, and K. Feind. The SGI Altix 3000 Global Shared-Memory Architecture. SGI White Paper, 2003.

Ahn, J., Erez, M., and Dally, W., "Scatter-Add in Data Parallel Architectures," Proceedings of the 11$^{st}$ Int'l Symposium on High-Performance Computer Architecture, 2005.

\* cited by examiner

ATOMIC MEMORY ACCESS HARDWARE IMPLEMENTATIONS

RELATED PATENT DOCUMENTS

This patent document claims the benefit, under 35 U.S.C. §119(e), of U.S. Provisional Patent Application No. 60/753,164 entitled "Atomic Memory Access Hardware Implementation" as was filed on Dec. 22, 2005.

FEDERALLY SPONSORED RESEARCH OR DEVELOPMENT

This invention was made with Government support under contract LLNL-B523583 awarded by the Department of Energy. The U.S. Government has certain rights in this invention.

FIELD OF THE INVENTION

The present invention relates generally to approaches for performing concurrent data processing, and more particularly, for using hardware to facilitate the processing of atomic-memory accesses.

BACKGROUND

Many important software applications exhibit large amounts of data parallelism, and modern computer systems are designed to take advantage of it. While much of the computation in the multimedia and scientific application domains is data parallel, certain operations involve costly serialization of the operations thereby increasing the run time. Examples include superposition type updates in scientific computing and histogram computations in media processing. A more specific example of a serial operation is known as scatter-add. The term scatter-add refers to a data-parallel operation in a form that relates to the well-known scalar fetch-and-op, specifically tuned for Single Instruction, Multiple Data (SIMD)/vector/stream style memory systems. Typically, a scatter-add mechanism scatters a set of data values to a set of memory addresses and adds each data value to each referenced memory location instead of overwriting it.

One commonly used algorithm related to operations that involve serialization is a histogram or binning operation. Given a data set, a histogram is simply the count of how many elements of the data set map to each bin.

Histograms are commonly used in signal and image processing applications, for example, to perform equalization and active thresholding. An inherent problem with parallelizing the histogram computation is memory collisions. Memory collisions occur where multiple computations performed on the data set update the same element in memory and often result in the creation of erroneous data due to the sequence of the operations. For this reason, many systems do not permit certain (requests for) operations to be performed in parallel or concurrently with other operations to the same memory location(s). Requests for operations to be performed in this regard are sometimes called "atomic" requests.

One conventional approach that attempts to address this problem is to introduce expensive synchronization. Before a hardware-processing element (PE) updates a location in memory that holds a histogram bin, it acquires a lock on the location. This lock is to ensure that no other PE will interfere with the update and that the result is correct. Once the lock is acquired, the PE updates the value by first reading the value from memory and then writing back the result. Finally, the lock is released so that future updates can occur.

This seemingly straightforward approach can be sometimes complicated by the SIMD nature of many architectures, which call for very fine-grained synchronization, as no useful work is performed until all PEs have acquired and released their lock. To overcome this limitation, parallel software constructs have been developed. One such construct is known as segmented scan and involves analyzing the targeted data in a segmented manner in order to improve control access to the lock-and-release memory access approach.

Previous processor-in-memory circuits suggest a fetch-and-add mechanism for atomically updating a memory location based on multiple concurrent requests from different processors. For example, an integer-only adder is placed in each network switch to serve as a gateway to the distributed shared memory. While fetch-and-add could be used to perform general integer operations, its main purpose is to provide an efficient mechanism for implementing various synchronization primitives. For this reason, fetch-and-add has been implemented in a variety of ways and is a standard hardware primitive in large scale multi-processor systems.

Several designs for aggregate and combining networks have also been suggested. For example, one suggested fetch-and-add mechanism includes a combining operation at each network switch, not just at the target network interface. The control network, which is not based on memory location, performs reductions and scans on integral data from the different processors in the system.

While each of these conventional approaches has its merits, improvement therein can be realized in terms of, among others, processing efficiency (speed) and robustness. For example, where atomic memory operations are implemented by serializing the requests or by software constructs involving excessive processing overhead, both processing efficiency and robustness can be adversely impacted. Robustness can also be a concern for conventional processor-in-memory architectures that use highly customized internal functional units to provide control over such request-processing. These and other issues have presented challenges to atomic-memory-request processing.

SUMMARY

The present invention is directed to overcoming the above-mentioned challenges and others related to a variety of data operations. The present invention is exemplified in a number of implementations and applications, some of which are summarized below.

Generally, embodiments of the present invention are directed to approaches (circuits and/or methods) for permitting a computer-operation requesting unit to issue atomic-memory access requests and for permitting the requests to be processed as if they were a standard memory request.

One particular aspect of the present invention is directed to approaches for implementing a memory-access intervention circuit for use in a data-processing circuit. In one embodiment, a data-processing circuit includes an address-request generator that issues memory access requests to a common memory. The memory-access intervention circuit is coupled between the generator and the common memory. A current atomic-memory access request is identified from the plurality of memory access requests. The data set corresponding to the current atomic-memory access request is stored in a data storage circuit within the memory-access intervention circuit. A determination is made as to whether the current atomic-memory access request corresponds to at least one previously-stored atomic-memory access request. Based upon the determination, the intervention circuit retrieves data associated with the current atomic-memory access request from the common memory for use in the memory-access intervention circuit. The memory-access intervention circuit modifies the retrieved data according to the current atomic-memory access request and in response to at least one other atomic-memory access request pending in the memory-access intervention circuit.

Various example embodiments of the present invention are directed to the facilitation of parallel data processing, such as those involving data-parallel forms of scalar fetch-and-op for SIMD/vector/stream style memory systems. With this approach, efficient and effective support for commonly used software constructs, such as binning and superposition on data-parallel SIMD architectures, can be provided through hardware. One such example embodiment is a special type of memory operation that can perform a data-parallel atomic read-modify-write within the memory system. In another such example embodiment, the invention is used with memory operations that request serial memory accesses. In another approach, the invention can be used with memory operations that involve parallel memory access. In yet another approach, the invention can be used with memory operations that are concurrently issued.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
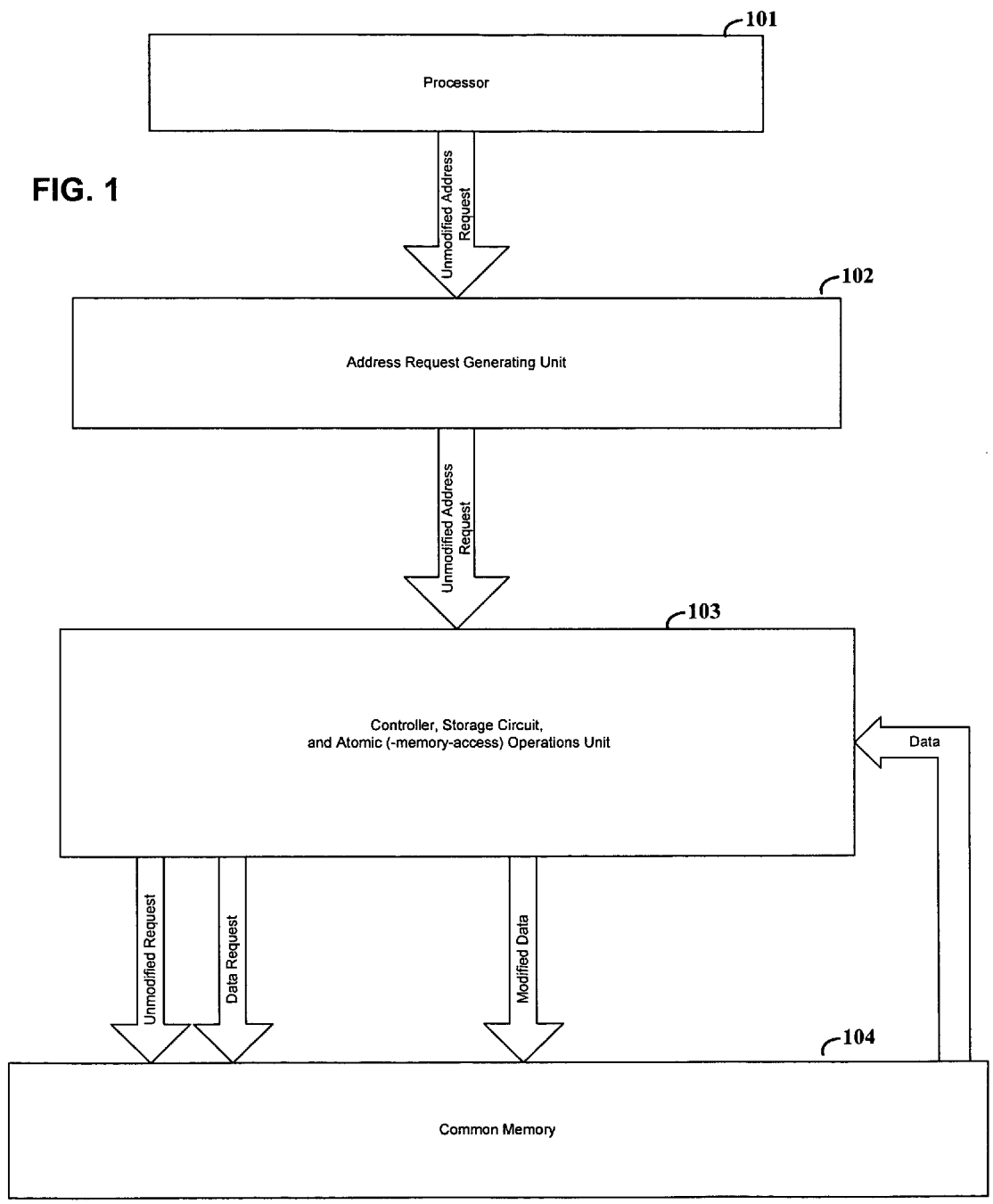
FIG. 1 is a block diagram of a system for implementing atomic memory requests, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for atomic memory operations in data-parallel architecture systems. While the present invention is not necessarily limited to such applications, various aspects of the invention may be appreciated through a discussion of various examples using this context.

The present invention is directed to approaches for implementing a memory-access intervention circuit for use in a data-processing circuit. In one embodiment, a data-processing circuit includes an address-request generator that issues memory access requests to a common memory. The memory-access intervention circuit is coupled between the generator and the common memory. A current atomic-memory access request is identified from the plurality of memory access requests. The data set corresponding to the current atomic-memory access request is stored in a data storage circuit within the memory-access intervention circuit. A determination is made as to whether the current atomic-memory access request corresponds to at least one previously-stored atomic-memory access request. Based upon the determination, the intervention circuit retrieves data associated with the current atomic-memory access request from the common memory for use in the memory-access intervention circuit. The memory-access intervention circuit modifies the retrieved data according to the current atomic-memory access request and according to at least one other atomic-memory access requests pending in the memory-access intervention circuit.

Turning now to the figures, FIG. 1 shows an example embodiment of the present invention as implemented in the form of a block diagram. FIG. 1 shows a CPU 101, an address request generator 102, a memory-access intervention circuit 103, and a common memory 104.

CPU 101 operates by reading and writing data to and from common memory 104 and performing modifications to the data. In one embodiment of the present invention, CPU 101 processes operation requests for atomic memory requests, such as scatter-add operations, by sending a memory access requests indicating the atomic memory requests. These atomic memory requests, along with other memory requests, are sent to address request generator 102. CPU 101 sends the atomic memory requests to the address request generator 102 without performing the modification step of the atomic memory request. Thus, CPU 101 handles the atomic-memory access requests as if they were a standard memory request.

Address request generator 102 processes the requests according to the state of the common memory 104. Address request generator 102 then sends the processed requests to memory-access intervention circuit 103.

For each memory access request, memory-access intervention circuit 103 determines whether the request is of the type of memory access request handled by memory-access intervention circuit 103. If a memory access request is determined to be of a different type of request, the memory access request is sent to common memory 104 as an unmodified memory access request. If, however, a memory access request is determined to be of the type handled by memory-access intervention circuit 103, memory-access intervention circuit 103 stores the request in storage circuit.

When a new memory access request is received from address request generator 102, a control and atomic operations circuit in circuit 103 determines whether there is a corresponding address already stored in the storage circuit. If there is not a corresponding address, the control and atomic operations circuit requests data located at the address of the request from common memory 104. The received data from common memory 104 is then stored in the storage circuit. If, however, there is a corresponding address, no data is requested from common memory 104 because the data was necessarily requested from common memory 104 for a previous memory access request.

The control and atomic operations circuit selects a current memory access-request from the storage circuit. If the memory access-request is the first such request for the current address, the corresponding data from common memory 104 is selected as well. The control and atomic operations circuit modifies the data from common memory 104 according to the type of memory access request (e.g., by adding one to the data, in the case of a histogram).

The control and atomic operations circuit also determines whether the storage circuit contains additional memory access requests for the current address. If there are any such memory access requests, the control and atomic operations circuit further modifies the data before writing the data to common memory 104. The data is further modified using the atomic operation of the control circuit. If there are no additional memory access requests for the current address, control and atomic operations circuit 103B writes the data to common memory 104. After writing the data to common memory 104, control and atomic operations circuit selects the next memory access request from storage and the process repeats.

Figure 2:
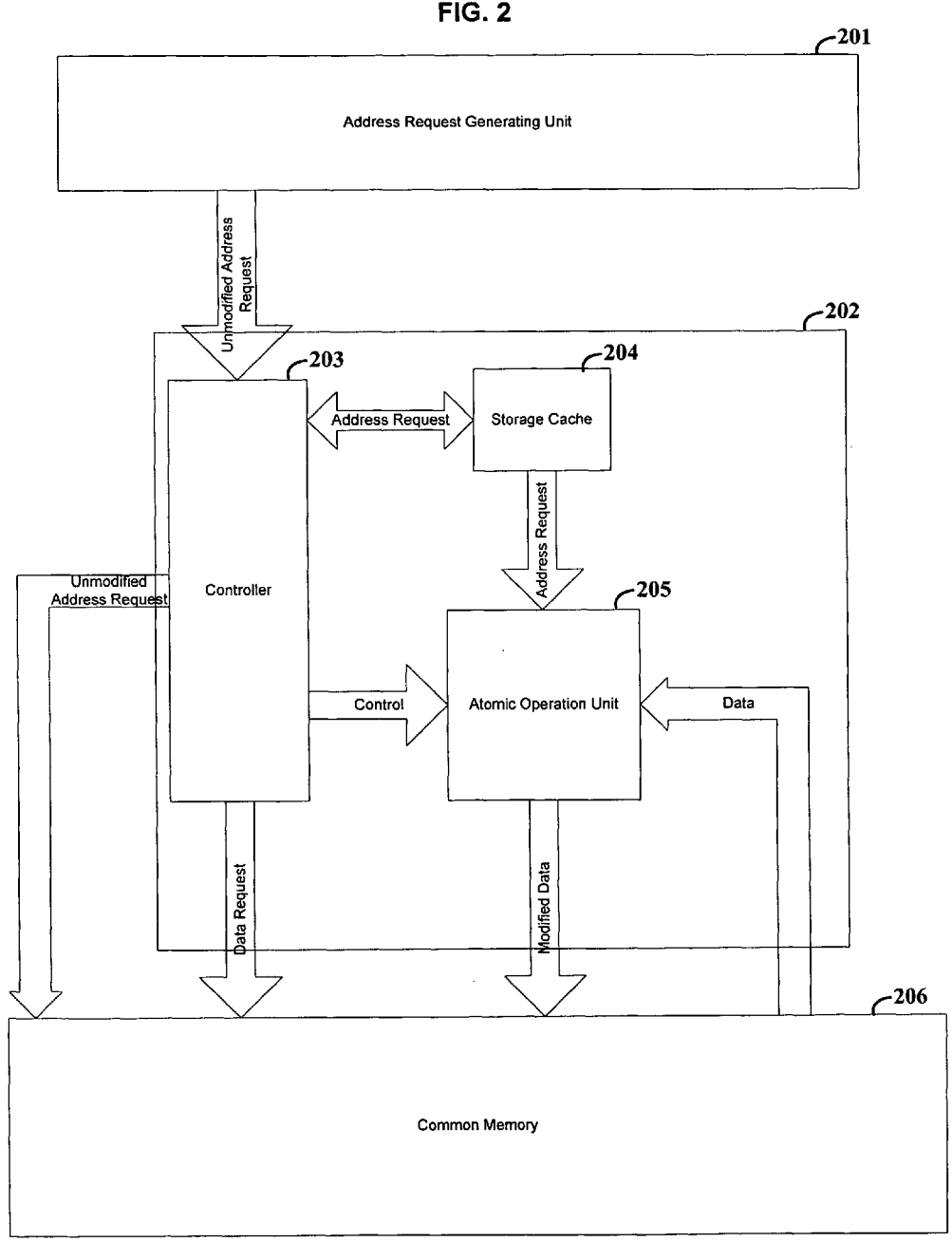
FIG. 2 shows a block diagram of a more specific example system for implementing atomic memory requests, according to an example embodiment of the present invention.

FIG. 2 shows another example embodiment of the present invention. FIG. 2 includes an address request generator 201 coupled to an atomic memory circuit 202 that is coupled to a common memory 206.

The address request generator 201 produces a vector (referred to as a stream in some architectures) of unmodified memory addresses, along with a vector of values to be modified (simply a vector of ones in the case of a histogram). If an individual memory request that arrives at the input of controller 202 is a standard memory-write or read, it bypasses the circuit and proceeds directly to common memory 206 as an unmodified address request. In another instance, a memory-write operation can first be checked against current requests currently stored in storage cache 204. If the memory-write operation corresponds to an existing memory request, the memory-write operation can be stalled or stored for later issuance. This can be particularly useful for blocking writes to memory locations that have yet to be modified by an atomic memory request. For a vector processor or similar system, this vector of addresses may be associated with specific types of vector instruction (e.g., scatter-add).

If an individual memory request is a memory request for the type of operation performed by atomic memory unit 205, then the memory request must be performed atomically. Accordingly, controller 203 uses storage cache 204 to ensure the memory request is performed atomically. The new request is placed in storage cache 204; if storage cache 204 is full, the operation stalls until there is room.

At the same time, the request address is compared to the addresses already buffered in storage cache 204 using a content-addressed-memory (CAM). If the address does not match any previously cached addresses, a request for data corresponding to the address is sent to common memory 206. If an entry matching the address is found in storage cache 204, no new memory requests are issued. When a current value returns from common memory 206, the value and address are stored in storage cache 204.

Atomic operation unit 205 modifies data associated with a current address using the data retrieved from common memory 206 and according to the type of memory request provided by address request generator 201. Once atomic operation unit 205 modifies the data, an acknowledgment signal can be sent to address request generator unit 201, and storage cache 204 is checked once more for the address belonging to the modified data. If a match is found, the modified data acts as a returned memory value and is further modified according to the type of memory request. If there are no more pending operations for this address, the modified data is written to common memory 206.

As mentioned above, once the request is handled, an acknowledgment signal may be sent to the address request generator unit 201 (or the DPA). Since atomicity is achieved for the data operations, no further synchronization need take place, and operations may be pipelined to achieve a high computational throughput.

Figure 3:
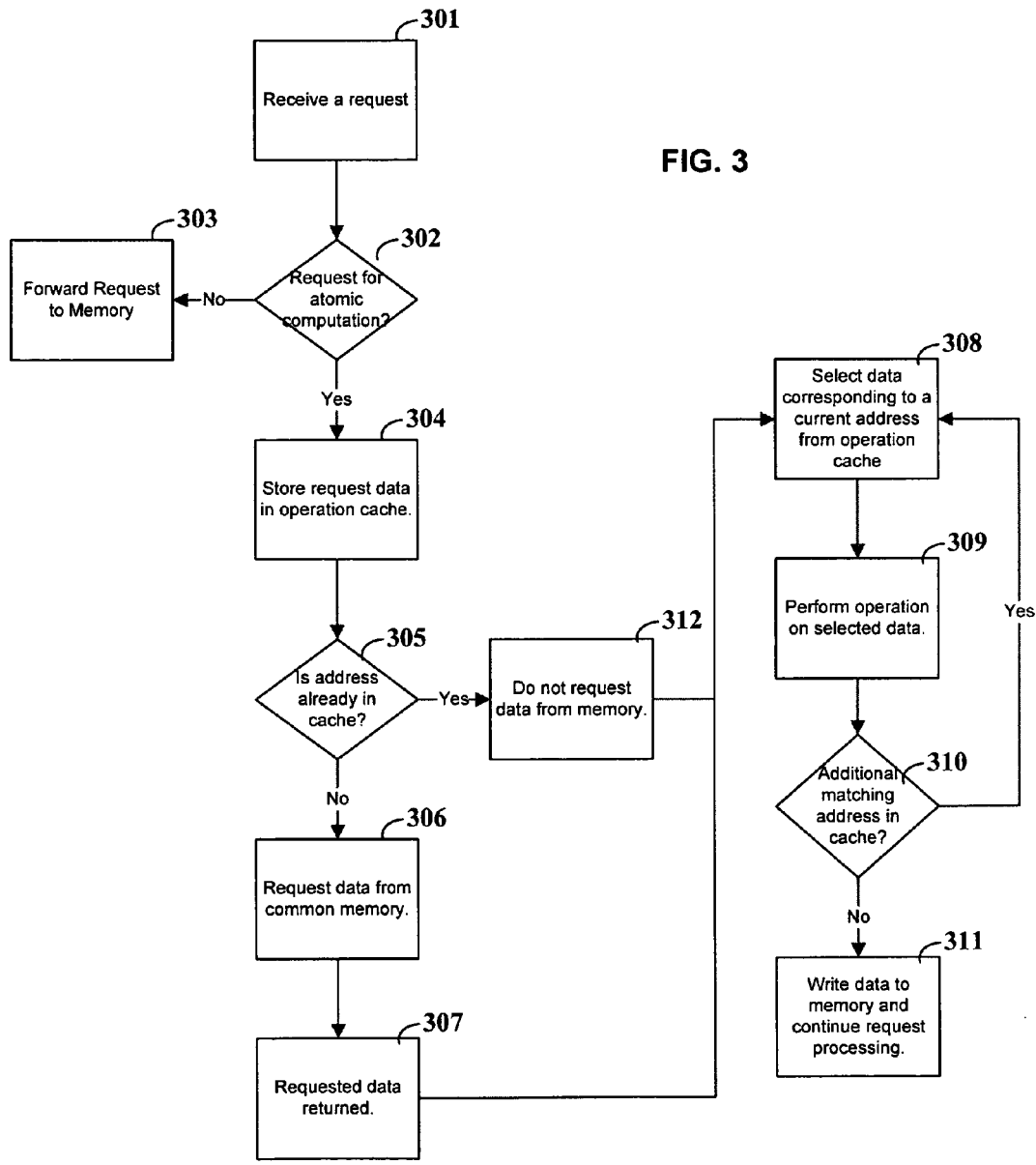
FIG. 3 is a flow diagram, in accordance with the present invention, depicting one of many example manners in which various embodiments of the present invention can be implemented.

FIG. 3 shows a flow diagram representing the steps for processing atomic memory operations, according to an example embodiment of the present invention.

At step 301, memory requests from an address request generator are received. These requests may be for either a standard memory access request, or they may require an atomic memory operation to be performed by an atomic operation unit.

At step 302, a decision is made regarding the type of memory access request provided. If the memory request is not a request for the atomic operation unit, then the unmodified request is passed to the common memory as shown in step 303. If the memory request is for the atomic memory operation corresponding to operation unit, then the request is not passed directly to memory, and instead, is used in step 304.

At step 303, the memory access request is forwarded to the common memory. The process does not perform further processing of the memory access request.

At step 304, the memory request is written to a storage cache for subsequent use. If the storage cache is full, the write is stalled until there is room.

At step 305, the address of the memory request is compared against other memory requests stored in the storage cache. If storage cache 204 contains an identical address, then the data corresponding to the address has already been requested. Therefore, there is no need to request data from the memory array, as shown in block 312. If the storage cache does not contain an identical address, a request is sent to the common memory for data corresponding to the address, as shown in step 306. When the common memory returns the requested data, the data is available for use, as shown in step 307.

At step 306, a memory-read request is sent to the common memory for data corresponding to the memory request. When the data is returned, it is used according to step 307 where the data returned from the common memory is available for use by the system. In this manner, steps 301-307 provide the data necessary for steps 308-311 to perform the data modification and write operations described below.

At step 308, data for a current memory request is obtained from the storage cache. Additionally, the data returned from the common memory in steps 306 and 307 can be made available. This data is then supplied to the atomic operation unit at step 309.

At step 309, the data is modified according to functionality of the atomic operation unit. This modification can take a number of forms. For example, a simple increment of the data can be performed. Alternatively, a multiplication, addition, or min/max of the data from the memory array and data supplied via the memory access request can be performed.

At step 310, the current memory request address is compared against any other memory access requests in the storage cache. If another memory access request with the same address is found in the memory cache, then the process is repeated beginning from block 308 using the current memory address and modified data. If there are no additional memory access requests for the address in the memory cache, the result of the atomic memory operation is sent to the memory array as a write request in step 311.

At step 311, the modified data from step 310 is written to the common memory. In addition to writing the data to the memory array, an acknowledgement signal can be provided to the address generator indicating that the operation has been completed. In one embodiment, the process will proceed to block 308, where the address corresponding to the next memory access request will be used. In another embodiment, the memory access requests are pipelined for faster processing. Thus, multiple memory access requests can be processed concurrently.

Several embodiments are particularly suited to the present invention. For example, while much of the computation of a typical multimedia or scientific application is data parallel, some sections of the code involve serialization, significantly limiting the overall performance of the application. One commonly used algorithm that exemplifies this is a histogram or binning operation. Given a data set, a histogram is simply the count of how many elements of the data set map to each bin.

One embodiment of the present invention atomically performs the addition for a histogram. Thus, the histogram is computed without multiple round-trips to memory for each bin update and without the explicit and costly synchronization of the conventional implementations. Also, the processor's main execution unit can continue running the program, while the sums are being updated in memory using the present invention's dedicated functional units. While these observations are true for a conventional scalar fetch-and-add, the present invention also extends these benefits to vector, stream, or other SIMD processors. The recent increased chip gate count capabilities of the current technology allows for floating-point computation capabilities implemented by the on-chip memory system at little cost.

In another embodiment of the present invention, a scatter-add operation circuit performs scatter-add operations on data. In a scatter-add operation, each value being written is summed with the value already in memory and then is written back to the memory. The scatter-add circuit allows the programmer the freedom to choose algorithms that were previously prohibitively expensive due to sorting, privatization complexity, and additional synchronization steps. Shifting computation to the scatter-add circuit from the main data parallel architecture (DPA) execution core allows the core to proceed with running the application, while the scatter-add hardware performs the summing operations. Also, the operational cache of the present invention may reduce the memory traffic required to perform the computation.

A subtle implication of using a hardware scatter-add has to do with the ordering of operations. A user may code an application using a specific order of data elements, yet the hardware reorders the actual sum computation due to the pipelining of the addition operations and the unpredictable memory latencies when fetching the original value. While the ordering of computation does not reflect program order, it is consistent in the hardware and repeatable for each run of the program. The user must be aware of the potential ramifications of this reordering when dealing with floating-point rounding errors and memory exceptions.

One implementation of a scatter-add circuit requires two operations involving an input data array and memory locations. The scatter-add operation atomically adds each value of an input data array to the value of the memory location it accesses. Another implementation requires that the value of the memory location be incremented by a constant each time it is accessed (a histogram is an example of where the constant is one).

Many of the scatter-add operations can be issued concurrently to the same memory location, and the hardware guarantees the atomicity of each operation. In one embodiment, the scatter-add is essentially a hardware implementation of the array combining scatter operation defined in High Performance Fortran (HPF).

The present invention can also be used to efficiently express other operators as well. One such important operator is the superposition operator that arises naturally in many physical scientific applications. Due to linearity in the physical objects simulated and due to the linearization and simplification of nonlinear problems, superposition is a prevalent operation in scientific codes. An example includes using particle-in-cell methods to solve for plasma behavior within the self-consistent electromagnetic field molecular dynamics to simulate the movement of interacting molecules, finite element methods, and linear algebra problems.

Simple extensions can be used to perform more complex operations. An example extension provides functionality for associative operations such as minimum/maximum and multiplication. Another example allows for the data requested from the memory array to be provided to the DPA. Such an operation is similar to a scalar fetch-and-op primitive and can be used to perform parallel queue allocation on SIMD vector and stream systems.

According to one example embodiment of the present invention, multiple nodes perform a scatter-add, or other such operation, concurrently. The atomicity of each individual addition is guaranteed by the fact that a node can only directly access its own part of the global memory. The network interface directs memory requests to pass through the remote scatter-add unit where they are merged with local requests. For multi-node configurations with local data-caches an optimization of this mechanism is to perform the scatter-add in two logical phases, a local phase and a global phase.

During the local phase a node performs a scatter-add on local and remote data within its cache. If a remote memory value has to be brought into the cache, it is simply allocated with a value of 0 instead of being read from the remote node. In the global phase the global scatter-add is computed by performing a sum-back of the cached values. A sum-back is similar to a cache write-back except that the remote write-request appears as a scatter-add on the node owning the memory address. The global sum is continuously updated as lines are evicted from the different caches (via sum-back), and to ensure the correct final result a flush-with-sum-back is performed as a synchronization step once all nodes complete.

According to an example embodiment of the present invention, the scatter-add unit itself is implemented using a simple controller with multiplexing wires, a functional unit that performs the integer and floating-point additions, and a combining store that is used to ensure atomicity as explained herein. The combining store can be implemented similar to a miss status handling register (MSHR) and write combining buffer of memory data caches. First, it acts similar to a MSHR and buffers scatter-add requests until the original value is fetched from memory. Second, it buffers scatter-add requests while an addition, which may take multiple memory or processor cycles, is performed. The physical implementation of the scatter-add unit may be accomplished using minimal chip area. In one instance, the area required is around $0.2 \, mm^2$; thus, 8 scatter-add units would require only 2% of a 10 mm×10 mm chip in 90 nm technology based on a standard-cell design. The overhead of the additional wire tracks necessary for delivering scatter-add requests within the memory system is negligible when designed in a standard-cell methodology and targeting a latency of 41 ns cycles.

A factor facilitating the implementation of scatter-add functionality in hardware is the rapid rate of VLSI device scaling. While a 64-bit floating-point functional unit consumed a large fraction of a chip in the past, corresponding area for such a unit in today's 90 nm technology requires only $0.3 \, mm^2$. As a result several floating-point/integer adders can be dedicated to the memory system. This allows the memory system to perform an atomic read-modify write, enabling the hardware scatter-add. A natural location for the scatter-add unit is at the memory interface of the DPA processor chip since all memory requests pass through this point. This configuration allows an easy implementation of atomic operations since the access to each part of global memory is limited to on-chip memory controller of that node. A further advantage of placing the scatter-add unit in front of the memory controller is that it can combine scatter-add requests and reduce memory traffic as will be explained shortly. Another possible configuration is to associate a scatter-add unit with each cache bank of the on-chip cache (if it exists) as the on-chip cache also processes every memory request.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include the use of any number of operations performed upon the data. Such modifications and changes do not depart from the true spirit and scope of the present invention, which is set forth in the following claims.

What is claimed is:

1. For use in a data-processing circuit having an address-request generator to issue a plurality of memory access requests to a common memory, a method of processing the memory access requests in a memory-access intervention circuit coupled between the generator and the common memory, the method comprising:
    using a current atomic-memory access request identified from the plurality of memory access requests,
        storing the current atomic-memory access request in a data storage circuit within the memory-access intervention circuit and
        determining whether the current atomic-memory access request corresponds to at least one previously-received atomic-memory access request that is currently stored within a data storage circuit located in the memory-access intervention circuit; and
    in response to determining whether the current atomic-memory access request corresponds to said at least one previously-received atomic-memory access request, implementing the current atomic-memory access request by
        retrieving a data set associated with the current atomic-memory access request from the common memory for use in the memory-access intervention circuit,
        storing the data set associated with the current atomic-memory access request in a data storage circuit within the memory-access intervention circuit,
        modifying the retrieved data set using a processing circuit located in the memory-access intervention circuit, the modification of the retrieved data set responsive to the current atomic-memory access request, and without an intervening step of sending the retrieved data to the common memory, subsequently modifying the retrieved data set, using the processing circuit located in the memory-access intervention circuit, the subsequent modification responsive to at least one other atomic-memory access request pending in the memory-access intervention circuit, and
        thereafter sending the retrieved data to the common memory.

2. The method of claim 1, further including selecting the current atomic-memory access request from the plurality of memory access requests.

3. The method of claim 1, wherein the step of modifying the retrieved data includes performing a mathematical operation using the stored data set corresponding to the current atomic-memory access request.

4. The method of claim 1, wherein the step of modifying the retrieved data includes performing the operation of one of addition and multiplication to the retrieved data.

5. The method of claim 1, further including a step of writing, to the common memory, the modified retrieved data in the memory-access intervention circuit.

6. The method of claim 1, wherein the atomic-memory access request is a read-modify write request.

7. The method of claim 1, further including a step of processing, using the processing circuit, an atomic-memory access instruction by providing, to the memory-access intervention circuit, a memory request that includes data indicating whether a memory request is an atomic-memory access request.

8. The method of claim 1, further including a step of using the processing circuit in a vector processor system.

9. The method of claim 1, wherein the method is implemented using an address-request generator that includes a processor with the memory-access intervention circuit located at an on-chip cache bank for the processor.

10. A data-processing arrangement, comprising:
    a common memory;
    an address-request generator to issue a plurality of memory access requests to the common memory; and
    a memory-access intervention circuit, coupled between the address-request generator and the common memory and having a data storage circuit and a processing circuit, to process the plurality of memory access requests by
        storing, in the data storage circuit, atomic-memory access requests from the plurality of memory access requests;
        identifying a current atomic-memory access request from the plurality of memory access requests,
        storing the current atomic-memory access request in the data storage circuit,
        determining whether the current atomic-memory access request corresponds to at least one previously-stored atomic-memory access request, and
        in response to determining whether the current atomic-memory access request corresponds to said at least one previously-received atomic-memory access request that is currently stored in the data storage circuit, implementing the current atomic-memory access request by
            retrieving data associated with the current atomic-memory access request from the data storage circuit, the retrieved data having been initially obtained by reading from the common memory for the at least one previously-stored atomic-memory access request in the memory-access intervention circuit, and
            modifying the retrieved data, using the processing circuit located in the memory-access intervention circuit in response to the current atomic-memory access request, and without an intervening step of sending the retrieved data to the common memory, subsequently modifying the retrieved data, using the processing circuit located in the memory-access intervention circuit, and wherein the subsequent modification is in response to at least one other atomic-memory access request pending in the memory-access intervention circuit.

11. The data-processing arrangement of claim 10, wherein the memory-access intervention circuit is configured to modify the retrieved data in the memory-access intervention circuit multiple times using a mathematical operation.

12. The data-processing arrangement of claim 10, wherein the address-request generator includes a processor.

13. The data-processing arrangement of claim 10, wherein the memory-access intervention circuit is configured to implement the current atomic-memory access request by writing the modified retrieved data in the memory-access intervention circuit to the common memory.

14. The data-processing arrangement of claim 10, wherein the atomic-memory access request is a read-modify write request.

15. The data-processing arrangement of claim 10, wherein the address-request generator includes a processor and the memory-access intervention circuit is located at an on-chip cache bank for the processor.

16. For use in a data-processing circuit arrangement having a common memory and an address-request generator to issue a plurality of memory access requests to the common memory, a memory-access intervention circuit coupled between the generator and the common memory, the memory-access intervention circuit comprising:
   a data storage circuit; and
   a controller and an operation unit for cooperatively processing atomic-memory access requests by
      using a current atomic-memory access request identified from the plurality of memory access requests,
      storing a data set corresponding to the current atomic-memory access request in the data storage circuit,
      determining whether the current atomic-memory access request corresponds to at least one previously-stored atomic-memory access request, and
      in response to determining whether the current atomic-memory access request corresponds to said at least one previously-stored atomic-memory access request, implementing the current atomic-memory access request by
         retrieving, from the data storage circuit, data associated with the current atomic-memory access request, the retrieved data having been initially obtained by reading from the common memory for at least one previous atomic-memory access request used by the memory-access intervention circuit, and
         modifying the retrieved data, in the operation unit using the processing circuit located in the memory-access intervention circuit in response to the current atomic-memory access request, and without an intervening step of sending the retrieved data to the common memory, subsequently modifying the retrieved data, using the processing circuit located in the memory-access intervention circuit, and wherein the subsequent modification is in response to at least one other atomic-memory access request pending in the memory-access intervention circuit.

17. The memory-access intervention circuit of claim 16, wherein the controller and the operation unit are further configured to
   modify the retrieved data in the memory-access intervention circuit for each pending atomic-memory access request associated with the retrieved data, and
   in response to determining that there are no remaining atomic-memory access request associated with the retrieved data, send the modified-retrieved data to the common memory.

18. The memory-access intervention circuit of claim 17, wherein the controller and the operation unit are further configured to repeat a mathematical operation on the retrieved data in the memory-access intervention circuit for each of the pending atomic-memory access requests associated with the retrieved data.

19. The memory-access intervention circuit of claim 17, wherein the controller and the operation unit are further configured to sum a value being written, as part of the pending atomic-memory access requests, with a value of retrieved data.

* * * * *

UNITED STATES PATENT AND TRADEMARK OFFICE
CERTIFICATE OF CORRECTION

PATENT NO. : 8,959,292 B1  
APPLICATION NO. : 11/643026  
DATED : February 17, 2015  
INVENTOR(S) : Ahn et al.

Page 1 of 1

It is certified that error appears in the above-identified patent and that said Letters Patent is hereby corrected as shown below:

In the Specification

Col. 1, please replace lines 14-17 with:

--This invention was made with Government support under contract W-7405-ENG-48 awarded by the Department of Energy. The Government has certain rights in the invention.--

Signed and Sealed this
Twenty-eighth Day of June, 2016

Michelle K. Lee
*Director of the United States Patent and Trademark Office*